April 30, 1946.  E. J. GIBBONS ET AL  2,399,342
APPARATUS FOR DETERMINING MOLD CAVITY PRESSURE
Filed Sept. 12, 1944
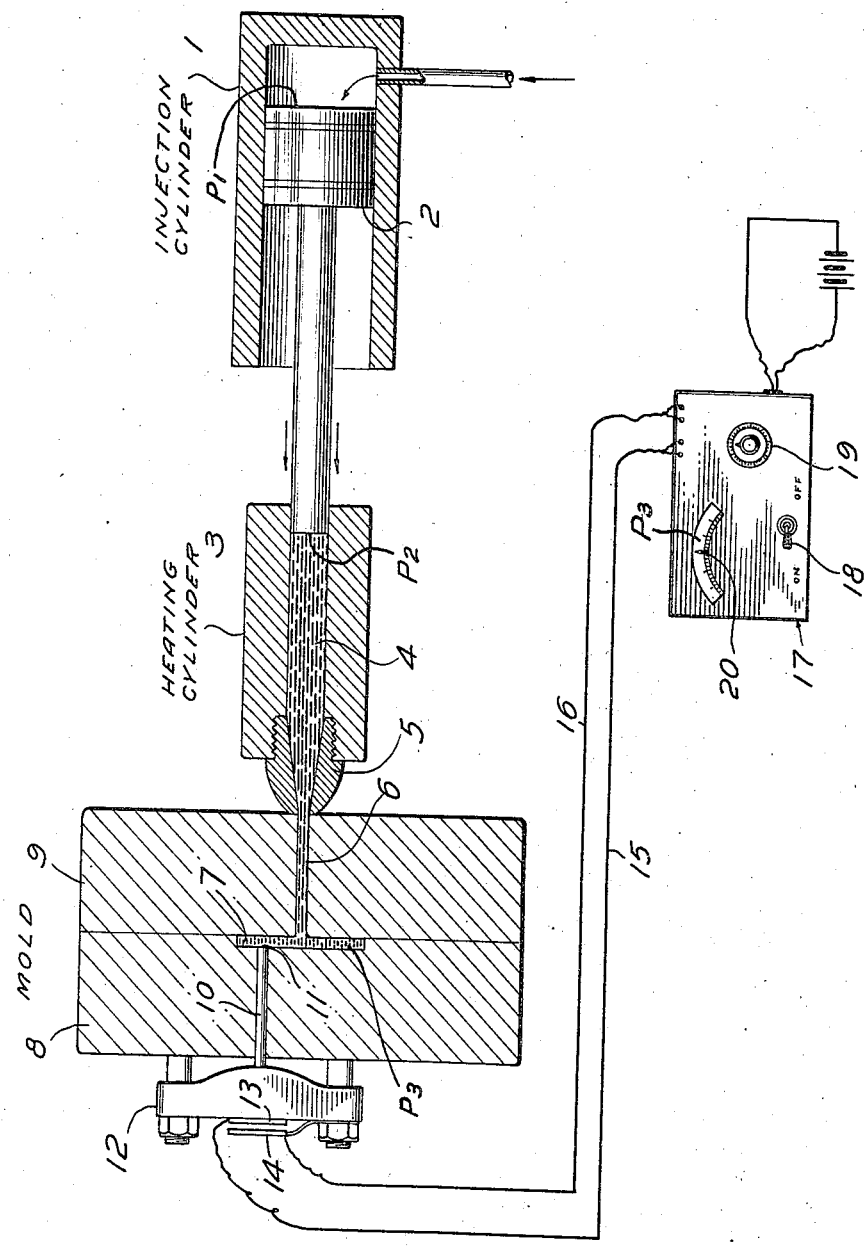
INVENTOR
EDWARD J. GIBBONS
THOMAS M. O'NEIL, JR
BY
Ellis S. Middleton
ATTORNEY Patented Apr. 30, 1946

2,399,342

UNITED STATES PATENT OFFICE 2,399,342

APPARATUS FOR DETERMINING MOLD CAVITY PRESSURE

Edward J. Gibbons and Thomas M. O'Neil, Jr., New York, N. Y., assignors to American Cyanamid Company, New York, N. Y., a corporation of Maine Application September 12, 1944, Serial No. 553,708

2 Claims. (Cl. 73—398)

The present invention relates to means for determining the pressure in a mold cavity.

In present day molding practice of thermoplastic material such as by injection molding it is commonly assumed that the pressure in the mold cavity at the time of molding is some fraction of the unit pressure on the ram. This fraction while unique in each case as it depends on many empirical factors, is always assumed.

Due to the fact that no method has been heretofore devised for independently determining the pressure in the mold cavity due to the very nature of the solidifying thermoplastic material when it hits the mold cavity this assumption has sometimes led to detrimental results.

It is the principal object of the present invention to devise means whereby the mold cavity pressure can be measured both at the instant of injection of the thermoplastic material and during the hardening cycle with reasonable accuracy.

It is another object of the invention to provide a combined mechanical and electrical hook-up whereby the pressure in the mold cavity at the moment of injection and during the hardening cycle may be read directly and conveniently in pounds per square inch inasmuch as these units are used in determining the pressure on the head of the ram in the injection chamber.

To this end the invention contemplates a mold cavity, with means to feed a thermoplastic material thereto under pressure, a loading pin having one face within the mold cavity and subject to the pressure therein, the pin extending outside the cavity and against a beam, subject to distortion by reason of the pressure within the mold through the pin, and a strain gauge secured to the tension face of the beam and electrically connected to an instrument whereby the change in electrical resistance of the gauge when the beam is under load may be read.

The invention further contemplates the novel combination, construction, and arrangement of parts and the method more fully hereinafter shown and described in the accompanying drawing in which the single figure is a diagrammatic representation of one embodiment of the invention.

Referring now to the form illustrated, the usual injection cylinder is shown at 1 having a piston or ram 2, one end of which operates within a heating cylinder 3 to eject heated and flowable thermoplastic material 4 from the cylinder through nozzle 5 and line 6 to a mold cavity 7 formed between the complementary parts 8 and 9 constituting a mold.

The part 8 of the mold is provided with a movable loading pin 10 the face 11 of which is flush with one surface of the mold cavity. The other end of the pin engages a beam 12 secured to the part 8 of the mold.

Secured to the tension face of the beam 12 is an active strain gauge 13 and a dummy gauge 14, the latter being fastened to the beam 12 but out of substantial contact therewith though in close proximity to the active gauge 13.

Both strain gauges are identical in construction and are of the usual and well-known type in which the deformation under load of a filament or filaments therein is measured by a change in filament electrical resistance.

These gauges 13 and 14 are electrically connected as by wires 15 and 16 respectively to an instrument 17 having a current flow switch 18, variable rheostat 19, and a galvanometer needle 20 subject to deflection.

Electrically contained within the instrument 17 is the usual resistance bridge circuit so arranged that the active gauge, when strained, unbalances the circuit and causes the galvanometer to deflect, all of which is of the usual construction. By means of the variable rheostat 19 the voltage applied to the bridge may be so adjusted that the galvanometer is caused to read directly in terms of the pressure in the mold cavity, that is in pounds per square inch.

This last may be readily accomplished by placing the strain gauge in a testing machine of the Olsen type so as to simulate mold loading. By testing this strain gauge in uniform increments of load, the galvanometer reading may be so calibrated as to read in pounds per square inch.

The dummy gauge 14, being similar in all aspects to the active gauge 13 and secured to the beam 12 though not subject to strain when the beam is loaded, serves to compensate through the electrical instrument 17 for any temperature changes which may occur in the beam itself and which would otherwise cause an error in the reading of the circuit unbalances when the active gauge 13 is operating.

It will thus be seen that upon the application of pressure to the injection cylinder, it is transmitted through piston or ram 2 which forces the thermoplastic material 4 into the mold cavity 7 where solidification takes place. The head 11 of loading pin 10 being subjected to the pressure actually occurring within the mold cavity itself, is transmitted through the beam 12 and may be read direct through deflection of the galvanometer needle 26.

As indicating the danger of assuming the pressure in the mold cavity it was found for instance, that when $P_1$ was 1500 pounds per square inch, $P_2$ was 35,000 pounds per square inch while $P_3$ was only 5400 pounds per square inch.

While the invention has been described with particular reference to specific embodiments, it is to be understood that it is not to be limited thereto, but is to be construed broadly and restricted solely by the scope of the appended claims.

What is claimed is:

1. In combination a mold having a cavity therein, means to feed a thermoplastic material thereto under pressure, a beam mounted on the exterior of the mold, a movable loading pin extending through a wall of the mold with an end surface flush with one surface of the mold cavity and one end engaging the beam, a strain gauge having a filament, the electrical resistance of which varies with its strain, secured to the tension side of the beam, and a measuring instrument electrically connected to said filament whereby the change in electrical resistance of the filament may be read when the filament is under a strain.

2. In combination a mold having a cavity therein, means to feed a thermoplastic material thereto under pressure, a beam mounted exteriorly of the mold, a movable loading pin with an end surface flush with one surface of the mold cavity, the pin extending through a wall of the mold cavity and engaging the beam, a strain gauge having a filament, the electrical resistance of which varies with its strain, secured to the tension side of the beam, and a measuring instrument electrically connected to said filament whereby the change in electrical resistance of the filament may be read when the filament is under a strain.

EDWARD J. GIBBONS.
THOMAS M. O'NEIL, Jr.